Oct. 6, 1931.  W. N. BOOTH  1,826,413
BRAKE DRUM
Filed Nov. 22, 1926
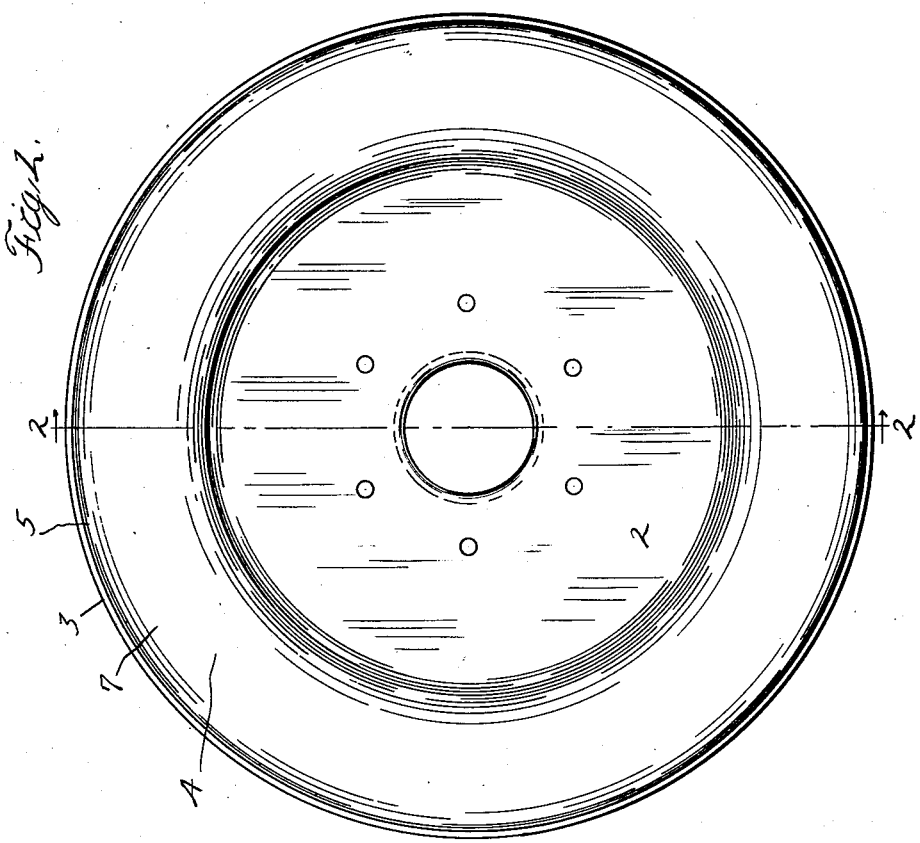
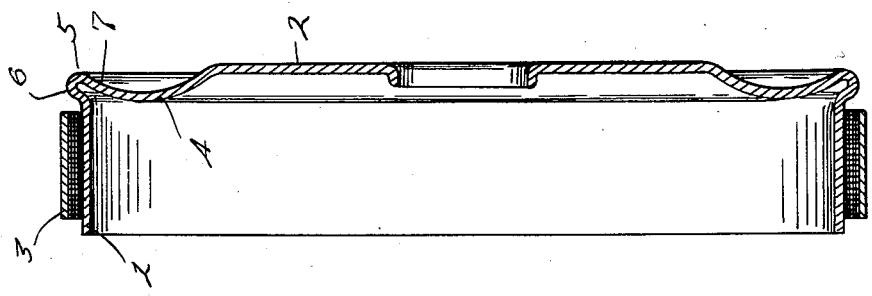
Inventor
William N. Booth
By
Attorneys Patented Oct. 6, 1931

1,826,413

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

BRAKE DRUM

Application filed November 22, 1926. Serial No. 150,085.

The invention relates to brake drums designed particularly for use with motor vehicle wheels. One of the objects of the invention is to provide a brake drum which is designed particularly for use with an external brake and which may be formed from relatively light gauge metal and which is so constructed that it is reinforced to prevent chattering upon application of the brake. Another object is to provide the brake drum with reinforcing means which may be formed during the forming of the brake drum and which do not hinder or interfere with the operation of the brake. Further objects of the invention reside in the novel features of construction and combinations and arrangements of parts as more fully hereinafter set forth.

In the drawings:—

Figure 1 is a side elevation of a brake drum embodying my invention;

Figure 2 is a cross section on the line 2—2 of Figure 1.

The brake drum is formed preferably by pressing the same from a sheet metal blank of relatively light gauge and has the brake flange 1 and the web 2. The flange 1 is cylindrical so that it is adapted for use with an external brake 3 as well as an internal brake if desired.

The web 2 has the annular reinforcing rib 4 at its periphery, this rib being transversely curved with its middle inwardly offset from the main portion of the web. 5 is a second annular reinforcing rib for the brake drum designed to prevent chattering upon application of the brake. This rib 5 extends radially beyond the brake flange 1 and is U-shaped and relatively deep and has relatively wide side sills 6 and 7 extending adjacent and substantially parallel to each other. The outer side wall 7 is a continuation of the outer portion of the rib 4 and is inclined outwardly as is also the inner side wall 6.

By reason if the reinforcing rib 5 with its adjacent relatively wide side walls, the brake drum is reinforced to an extent to prevent chattering upon application of the external brake, or the internal brake, if used. The reinforcing rib 4 also assists in reinforcing the brake drum and the two ribs together provide a strong construction of brake drum which may be formed from relatively light gauge metal.

In forming the brake drum the same is drawn up from a relatively light gauge sheet metal blank and first cupped to form the brake flange and the web, the latter being preferably convex. The free or inner edge of the brake flange may then be trimmed after which the web is flattened, during which time the ribs 4 and 5 may be formed. As a result, the thickness of the material forming the brake flange, the ribs and the main portion of the web are substantially of the same thickness.

What I claim as my invention is:

1. A brake drum having a brake flange, a web, and a U-shaped rib integral with and connecting said flange and web for reinforcing the drum, said rib extending transversely of said flange and having relatively wide side walls adjacent to each other.

2. A brake drum having a brake flange, a web, and a U-shaped rib integral with and connecting said flange and web and extending radially outwardly beyond the outer face of said flange, said rib comprising adjacent substantially parallel side walls of relatively great width for reinforcing the drum.

3. A brake drum having a brake flange, a web provided with an annular reinforcing rib and a relatively deep annular reinforcing rib connecting said flange and web.

4. A brake drum having a brake flange, a web provided with a peripheral annular reinforcing rib and a rib integral with and connecting said flange and first mentioned rib and having relatively wide side walls adjacent to each other for reinforcing said flange.

5. A brake drum having a cylindrical brake flange, a web provided with an annular transversely curved peripheral reinforcing rib, and a relatively deep annular reinforcing rib integral with and connecting said flange and first mentioned rib and extending radially outwardly beyond the outer face of said flange, said second mentioned rib comprising adjacent side walls and one of said side walls being a continuation of said first mentioned rib.

6. A brake drum having a brake flange, a web, and a substantially U-shaped reinforcing rib integral with and connecting said flange and web and extending radially outwardly beyond the periphery of the flange.

7. A brake drum having a brake flange, a web, and a substantially U-shaped reinforcing rib formed integral with said flange and projecting radially therefrom.

In testimony whereof I affix my signature.

WILLIAM N. BOOTH.